US007475536B2

(12) United States Patent
Wada et al.

(10) Patent No.: US 7,475,536 B2
(45) Date of Patent: Jan. 13, 2009

(54) EXHAUST GAS PURIFYING APPARATUS FOR INTERNAL COMBUSTION ENGINE

(75) Inventors: Katsuji Wada, Wako (JP); Hiroshi Ohno, Wako (JP); Norio Suzuki, Wako (JP); Tomoko Morita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 318 days.

(21) Appl. No.: 11/046,817

(22) Filed: Feb. 1, 2005

(65) Prior Publication Data

US 2005/0178109 A1   Aug. 18, 2005

(30) Foreign Application Priority Data

Feb. 16, 2004  (JP)  ............... 2004-037812

(51) Int. Cl.
*F01N 3/00*  (2006.01)

(52) U.S. Cl. .............. 60/295; 60/274; 60/276; 60/301

(58) Field of Classification Search .......... 60/274, 60/276, 285, 295, 301
See application file for complete search history.

(56) References Cited

U.S. PATENT DOCUMENTS

| | | | | |
|---|---|---|---|---|
| 5,369,956 | A | * | 12/1994 | Daudel et al. ............. 60/276 |
| 5,611,198 | A | * | 3/1997 | Lane et al. ............... 60/299 |
| 5,782,087 | A | * | 7/1998 | Kinugasa et al. ........... 60/285 |
| 5,783,160 | A | * | 7/1998 | Kinugasa et al. .......... 423/237 |
| 5,785,937 | A | * | 7/1998 | Neufert et al. .......... 423/213.2 |
| 6,109,024 | A | * | 8/2000 | Kinugasa et al. ........... 60/285 |
| 6,176,079 | B1 | * | 1/2001 | Konrad et al. ............. 60/274 |
| 6,338,244 | B1 | | 1/2002 | Guenther et al. |
| 6,732,507 | B1 | * | 5/2004 | Stanglmaier et al. ........ 60/285 |
| 6,742,326 | B2 | * | 6/2004 | Xu et al. ................ 60/284 |
| 6,820,415 | B2 | * | 11/2004 | Abet et al. ............... 60/286 |
| 2002/0116920 | A1 | * | 8/2002 | Pfeifer et al. ............. 60/299 |
| 2003/0136115 | A1 | | 7/2003 | Abet et al. |
| 2004/0076565 | A1 | * | 4/2004 | Gandhi et al. ............. 423/235 |

FOREIGN PATENT DOCUMENTS

| | | |
|---|---|---|
| DE | 199 49 046 A1 | 5/2001 |
| EP | 0 773 354 A1 | 5/1997 |
| EP | 0 957 242 A2 | 11/1999 |
| EP | 1 203 611 A1 | 5/2002 |
| EP | 1 559 892 A1 | 8/2005 |
| GB | 2375059 * | 6/2002 |
| JP | 2586739 | 5/1996 |
| WO | WO 97/17532 | 5/1997 |
| WO | WO 97/19262 | 5/1997 |
| WO | WO 2004/090296 | 10/2004 |

* cited by examiner

*Primary Examiner*—Thomas E Denion
*Assistant Examiner*—Diem Tran
(74) *Attorney, Agent, or Firm*—Arent Fox LLP

(57) ABSTRACT

An exhaust gas purifying apparatus for an internal combustion engine having an exhaust system. The apparatus includes a NOx purifying device provided in the exhaust system. This device removes NOx from exhaust gases when a concentration of oxygen in the exhaust gases is higher than a concentration of reducing components in the exhaust gases; generates ammonia and retains the generated ammonia when the concentration of reducing components in the inflowing exhaust gases is higher than the concentration of oxygen; and purifies NOx with the retained ammonia when the concentration of reducing components in the inflowing exhaust gases is lower than the concentration of oxygen. A residual amount of ammonia retained in the NOx purifying device is estimated. The concentration of reducing components in the exhaust gases is switched with respect to the concentration of oxygen according to the estimated residual amount.

2 Claims, 7 Drawing Sheets

US 7,475,536 B2

EXHAUST GAS PURIFYING APPARATUS FOR INTERNAL COMBUSTION ENGINE

CROSS REFERENCE TO RELATED APPLICATIONS

This application claims priority from Japanese Application No. 2004-37812 filed Feb. 16, 2004.

BACKGROUND OF THE INVENTION

1. Field of the Invention

The present invention relates to an exhaust gas purifying apparatus for an internal combustion engine, and particularly, to an exhaust gas purifying apparatus having a NOx purifying device which purifies NOx in exhaust gases.

Description of the Related Art

An exhaust gas purifying apparatus for an internal combustion engine, having a NOx absorbent disposed in the exhaust system for absorbing NOx, is shown in Japanese Patent Publication No. 2586739. According to this apparatus, an amount of NOx absorbed by the NOx absorbent is estimated, and the air-fuel ratio is enriched when the estimated amount of NOx exceeds the permissible amount. This makes an amount of reducing components (HC, CO) flowing into the NOx absorbent increase. Accordingly, NOx is discharged from the NOx absorbent and reduced. That is, the NOx absorbed by the NOx absorbent is discharged and reduced by enriching the air-fuel ratio when the amount of the absorbed NOx exceeds the permissible amount, to thereby restore the NOx purification performance of the exhaust gas purifying apparatus, since the NOx purification performance of the exhaust gas purifying apparatus becomes lower if the amount of NOx absorbed by the NOx absorbent increases.

When the air-fuel ratio is enriched, the concentration of reducing components (HC, CO) in exhaust gases becomes higher, and ammonia is generated in the exhaust gas purifying apparatus. Therefore, an exhaust gas purifying apparatus which has capacity for retaining ammonia and can reduce NOx during the lean burn operation, using the ammonia retained during the enrichment operation, is being developed.

However, in the apparatus shown in Japanese Patent Publication No. 2586739, the reduction of NOx with ammonia during the lean burn operation, and the amount of ammonia retained during the enrichment operation are not taken into consideration. Therefore, if the method for estimating an amount of NOx shown in Japanese Patent Publication No. 2586739 is applied to the exhaust gas purifying apparatus having the capacity of retaining ammonia, there is a possibility that the air-fuel ratio enrichment may not be performed at an appropriate timing, thereby causing increased fuel consumption.

SUMMARY OF THE INVENTION

It is accordingly an object of the present invention to provide an exhaust gas purifying apparatus for an internal combustion engine that switches a concentration of reducing components in exhaust gases at an appropriate timing. The ammonia generated, by raising the concentration of reducing components in the exhaust gases, reduces NOx during the lean burn operation in which the concentration of reducing components in the exhaust gases is low.

To attain the above object, the present invention provides an exhaust gas purifying apparatus for an internal combustion engine (1) having an exhaust system (4). The exhaust gas purifying apparatus includes NOx purifying means (11), residual amount estimating means (20, S13-S15, S18, S22-S24, S26), and exhaust control means (12, 13, 20, S19, S20, S27, S28). The NOx purifying means (11) is provided in the exhaust system and purifies NOx in exhaust gases from the engine (1) when a concentration of oxygen in the exhaust gases is higher than a concentration of reducing components in the exhaust gases. The NOx purifying means (11) generates ammonia and retains the generated ammonia when the concentration of reducing components in the inflowing exhaust gases is higher than the concentration of oxygen. Further, the NOx purifying means purifies NOx with the retained ammonia when the concentration of reducing components in the inflowing exhaust gases is lower than the concentration of oxygen. The residual amount estimating means estimates a residual amount ($\Sigma$ NH3) of the ammonia retained in the NOx purifying means (11). The exhaust control means switches the concentration of reducing components in the exhaust gases flowing into the NOx purifying means (11) from a lower side to a higher side with respect to the concentration of oxygen, or from the higher side to the lower side according to the residual amount ($\Sigma$ NH3) estimated by the residual amount estimating means.

With this configuration, the residual amount of the ammonia retained in the NOx purifying means is estimated, and the concentration of reducing components in the exhaust gases flowing into the NOx purifying means is switched from the lower side to the higher side with respect to the concentration of oxygen or from the higher side to the lower side according to the estimated residual amount. NOx purification performance at the time the concentration of reducing components is lower than the oxygen concentration, such as during the lean burn operation, changes according to the residual amount of ammonia. Consequently, by switching the concentration of reducing components from the lower side to the higher side with respect to the oxygen concentration, according to the residual amount of ammonia, good NOx purification performance can be maintained. Further, by switching the concentration of reducing components from the higher side to the lower side with respect to the oxygen concentration, according to the residual amount of ammonia, the situation where the amount of generated ammonia exceeds the ammonia retaining capacity of the NOx purifying means, can be avoided.

Preferably, the residual amount estimating means estimates the residual amount of ammonia according to a temperature of the NOx purifying means (11).

With this configuration, the residual amount of ammonia can be properly estimated, in consideration of the generation amount or the consumption amount of ammonia, which changes depending on the temperature of the NOx purifying means.

Preferably, the exhaust control means switches the concentration of reducing components to the lower side with respect to the concentration of oxygen when the concentration of reducing components is higher than the concentration of oxygen and the estimated residual amount ($\Sigma$ NH3) reaches a predetermined upper limit value (NH3THH). The exhaust control means switches the concentration of reducing components to the higher side with respect to the concentration of oxygen when the concentration of reducing components is lower than the concentration of oxygen and the estimated residual amount ($\Sigma$ NH3) reaches a predetermined lower limit value (NH3THL).

Preferably, the exhaust gas purifying apparatus further includes rotational speed detecting means for detecting a rotational speed (NE) of the engine and accelerator pedal operation amount detecting means for detecting an operation amount (AP) of an accelerator pedal provided in a vehicle driven by the engine. The residual amount estimating means estimates the residual amount (Σ NH3) according to the detected engine rotational speed (NE) and the detected accelerator pedal operation amount (AP).

Preferably, the residual amount estimating means includes a basic generation amount calculating means, a first temperature correction coefficient calculating means, an ammonia generation amount calculating means, a basic consumption amount calculating means, second temperature correction coefficient calculating means, and ammonia consumption amount calculating means. When the concentration of reducing components is higher than the concentration of oxygen, the basic generation amount calculating means calculates a basic generation amount (NH3BP) of ammonia according to the detected engine rotational speed (NE) and the detected accelerator pedal operation amount (AP). The first temperature correction coefficient calculating means calculates a first temperature correction coefficient (KNH3P) according to the temperature (TCAT) of the NOx purifying means. The ammonia generation amount calculating means calculates a generation amount (NH3P) of ammonia by correcting the basic generation amount (NH3BP) with the first temperature correction coefficient (KNH3P). When the concentration of reducing components is lower than the concentration of oxygen, the basic consumption amount calculating means calculates a basic consumption amount (NH3BC) of ammonia according to the detected engine rotational speed (NE) and the detected accelerator pedal operation amount (AP). The second temperature correction coefficient calculating means for calculating a second temperature correction coefficient (KNH3C) according to the temperature (TCAT) of the NOx purifying means. The ammonia consumption amount calculating means calculates a consumption amount (NH3C) of ammonia by correcting the basic consumption amount (NH3BC) with the second temperature correction coefficient (KNH3C). The residual amount estimating means calculates the residual amount (Σ NH3) using the generation amount (NH3P) and the consumption amount (NH3C) of ammonia.

Preferably, the exhaust gas purifying apparatus further includes NOx amount estimating means for estimating an amount (ΣNOx) of NOx adsorbed by the NOx purifying means. The exhaust control means switches the concentration of reducing components to the lower side when the concentration of reducing components is higher than the concentration of oxygen and the amount (ΣNOx) of NOx estimated by the NOx amount estimating means substantially reaches "0".

Preferably, the exhaust control means switches the concentration of reducing components to the higher side when the concentration of reducing components is lower than the concentration of oxygen and the amount of NOx estimated (Σ NOx) by the NOx amount estimating means reaches a predetermined upper limit value (NOxTHH).

Other objects and features of the invention will be more fully understood from the following detailed description and appended claims when taken with the accompanying drawings.

DETAILED DESCRIPTION OF THE PREFERRED EMBODIMENTS

Preferred embodiments of the present invention will now be described with reference to the drawings.

Figure 1:
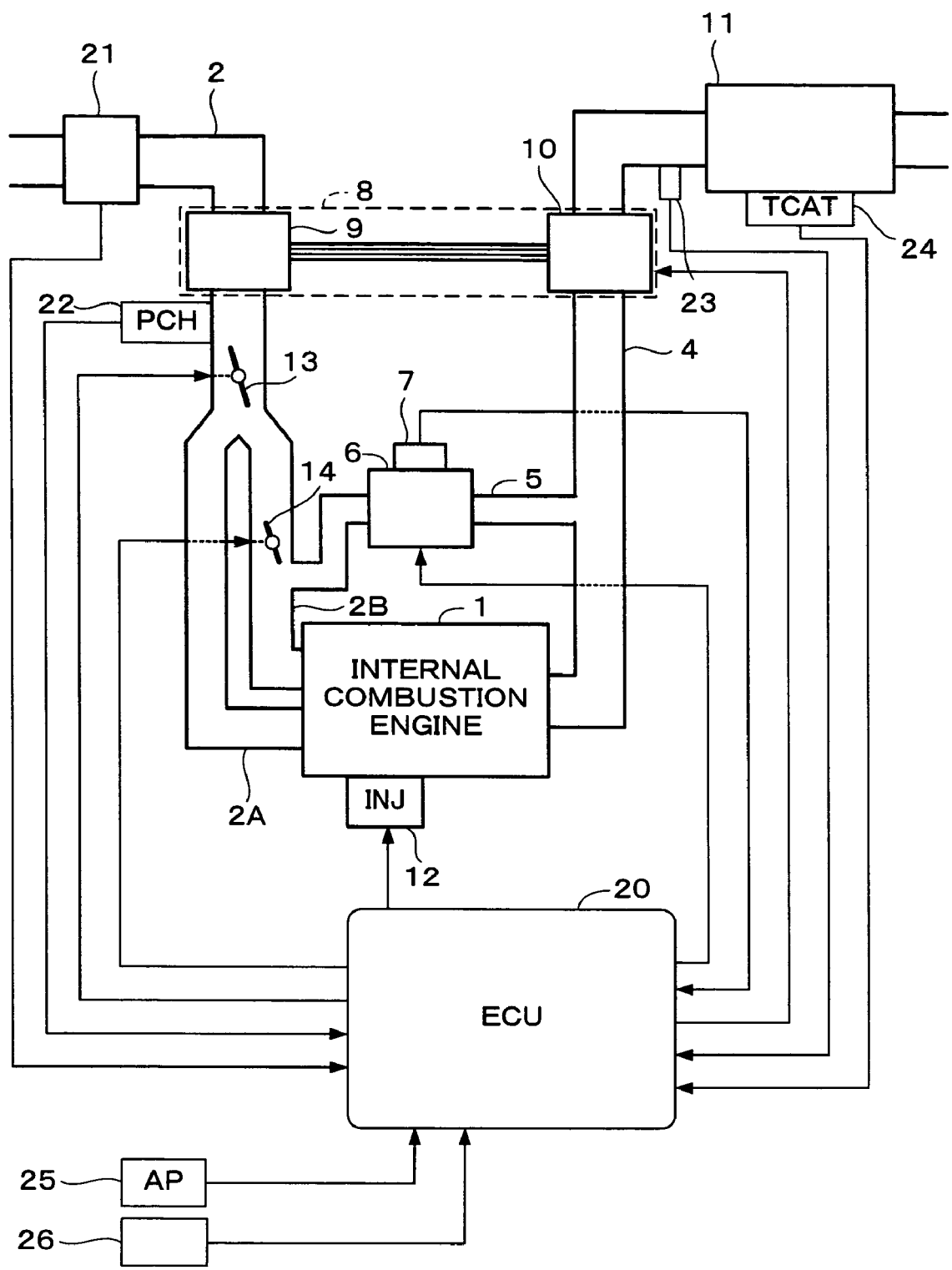
FIG. 1 is a schematic diagram showing an internal combustion engine and an exhaust gas purifying apparatus therefor according to one embodiment of the present invention.

FIG. 1 is a schematic diagram showing a configuration of an internal combustion engine (hereinafter referred to as "engine") and an exhaust gas purifying apparatus therefor, according to one embodiment of the present invention. The engine 1 is a diesel engine in which fuel is directly injected into cylinders, and each cylinder is provided with a fuel injection valve 12. The fuel injection valve 12 is electrically connected to an electronic control unit 20 (hereinafter referred to as "ECU"). A valve opening period and a valve opening timing of the fuel injection valve 12 are controlled by the ECU 20.

The engine 1 has an intake pipe 2, an exhaust pipe 4, and may include a turbocharger 8. The turbocharger 8 includes a turbine 10 which is driven with the kinetic energy of exhaust gases, and a compressor 9 which is rotated by the turbine 10 and compresses intake air.

The turbine 10 has a plurality of movable vanes (not shown), and is configured so that the rotational speed of the turbine 10 can be varied by changing an opening of the movable vanes (hereinafter referred to as "vane opening"). The vane opening of the turbine 10 is electro-magnetically controlled by the ECU 20. More specifically, the ECU 20 supplies a control signal of a variable duty-ratio to the turbine 10 and controls the vane opening by the control signal. If the vane opening is controlled to increase, the efficiency of the turbine 10 increases and the turbine rotational speed increases. Consequently, the boost pressure increases.

A throttle valve 13 for controlling an intake air flow rate is disposed downstream of the compressor 9 in the intake pipe 2. The intake pipe 2 branches out corresponding to each cylinder at a portion downstream of the throttle valve 13. Each of the branched intake pipes 2 further branches out to two intake ports 2A and 2B. It should be noted that FIG. 1 shows a configuration corresponding to one cylinder.

Each cylinder of engine 1 is provided with two intake valves (not shown) and two exhaust valves (not shown). Two intake gates (not shown), opened and closed by the two intake valves, are connected respectively to the intake ports 2A and 2B.

Further, a swirl control valve 14 (hereinafter referred to as "SCV") is disposed in the intake port 2B. The SCV 14 restricts the amount of air inhaled through the intake port 2B to generate a swirl in the combustion chamber of the engine 1. The throttle valve 13 and the SCV 14 are butterfly valves, each of which is driven by an electric motor or a hydraulic actuator. Valve openings of these valves are controlled by the ECU 20.

An exhaust gas recirculation passage 5 is provided between the exhaust pipe 4 and the intake port 2B. The exhaust gas recirculation passage 5 recirculates exhaust gases to the intake port 2B. An exhaust gas recirculation control valve 6 (hereinafter referred to as "EGR valve") for controlling an exhaust gas recirculation amount is disposed in the exhaust gas recirculation passage 5. The EGR valve 6 is an electromagnetic valve having a solenoid. A valve opening of the EGR valve 6 is controlled by the ECU 20. The EGR valve 6 is provided with a lift sensor 7 for detecting a valve opening (valve lift amount) LACT, and the detection signal is supplied to the ECU 20. The exhaust gas recirculation passage 5 and the EGR valve 6 constitute an exhaust gas recirculation mechanism. The EGR valve 6 is controlled with a control signal of a variable duty-ratio so that the valve lift amount LACT coincides with a lift amount command value LCMD which is set according to the engine operating condition.

An intake air flow rate sensor 21 and a boost pressure sensor 22 are disposed in the intake pipe 2. The intake air flow rate sensor 21 detects an intake air flow rate GA. The boost pressure sensor 22 detects a boost pressure PCH at a portion of the intake pipe 2 downstream of the compressor 9. The detection signals from these sensors are supplied to the ECU 20.

A proportional type air-fuel ratio sensor 23 (hereinafter referred to as "LAF sensor") is disposed downstream of the turbine 10 in the exhaust pipe 4, and a NOx purifying device 11 for removing NOx in exhaust gases is disposed downstream of the LAF sensor 23. A detection signal, which is substantially proportional to an oxygen concentration (air-fuel ratio) in the exhaust gases, is supplied to the ECU 20 by the LAF sensor 23.

The NOx purifying device 11 includes platinum (Pt) as a catalyst, ceria ($CeO_2$) having NOx adsorbing capacity, and zeolite for retaining ammonia ($NH_3$) in the exhaust gases as ammonium ion ($NH_4^+$). The platinum is carried by an alumina ($Al_2O_3$) carrier. The NOx purifying device 11 is provided with a catalyst temperature sensor 24 which detects a temperature TCAT of the catalyst in the NOx purifying device 11. The detection signal output from the sensor 24 is supplied to the ECU 20.

When the amount of ammonia adsorbed in the NOx purifying device 11 decreases, NOx purifying performance of the NOx purifying device 11 is reduced. Therefore, in order to maintain the NOx purifying performance, supply of reducing components to the NOx purifying device 11 (hereinafter referred to as "deoxidization") is timely performed. In this deoxidization, reducing components are supplied to the NOx purifying device 11 by enriching the air-fuel ratio of the air-fuel mixture in the combustion chamber to a rich side with respect to the stoichiometric ratio. This enrichment of the air-fuel ratio is performed by increasing the amount of fuel injected from the fuel injection valve 12 and decreasing the intake air flow rate by the throttle valve 13. That is, by enriching the air-fuel ratio, the concentration of reducing components in the exhaust gases flowing into the NOx purifying device 11 becomes higher than the oxygen concentration, and deoxidization is performed.

An accelerator sensor 25 and a crank angle position sensor 26 are provided. The accelerator sensor 25 detects an operation amount AP of the accelerator (not shown) of the vehicle driven by the engine 1 (hereinafter referred to as "accelerator pedal operation amount AP"). The crank angle position sensor 26 detects a rotational angle of the crankshaft (not shown) of the engine 1. The detection signals from these sensors are supplied to the ECU 20.

The crank angle position sensor 26 consists of a cylinder discrimination sensor, a TDC sensor, and a CRK sensor. The cylinder discrimination sensor outputs a pulse (hereinafter referred to as "CYL pulse") at a predetermined crank angle position for a specific cylinder of the engine 1. The TDC sensor outputs a TDC pulse at a predetermined crank angle position before a top dead center (TDC) starting at an intake stroke for each cylinder (at every 180-degree crank angle in the case of a four-cylinder engine). The CRK sensor generates one pulse (hereinafter referred to as "CRK pulse") when the crankshaft rotates through a predetermined angle (e.g., an angle of 30 degrees). This angle is smaller than the angle used to generate the TDC pulse. Each of the CYL pulse, the TDC pulse, and the CRK pulse is supplied to the ECU 20. These pulses are used for fuel injection control and for detection of an engine rotational speed NE.

The ECU 20 includes an input circuit, a central processing unit (hereinafter referred to as "CPU"), a memory circuit, and an output circuit. The input circuit performs numerous functions, including shaping the waveforms of input signals from the various sensors, correcting the voltage levels of the input signals to a predetermined level, and converting analog signal values into digital signal values. The memory circuit preliminarily stores various operating programs to be executed by the CPU and stores the results of computations, or the like, by the CPU. The output circuit supplies control signals to the fuel injection valves 12, the EGR valve 6, the turbine 10, the throttle valve 13, the SCV 14, and the like.

Figure 2A:
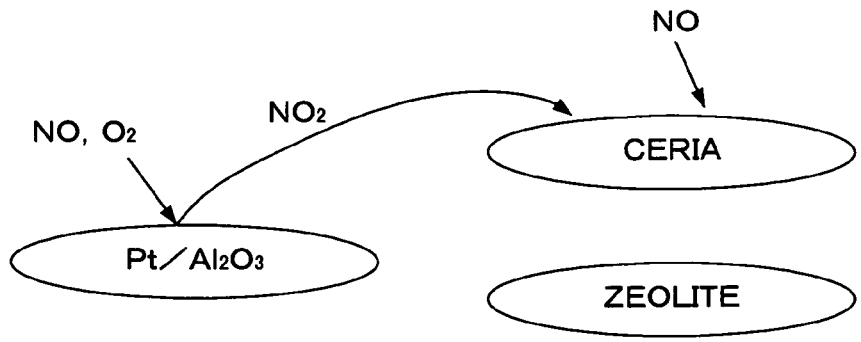
FIGS. 2A-2C illustrate the NOx purifying device shown in FIG. 1.
Figure 2B:
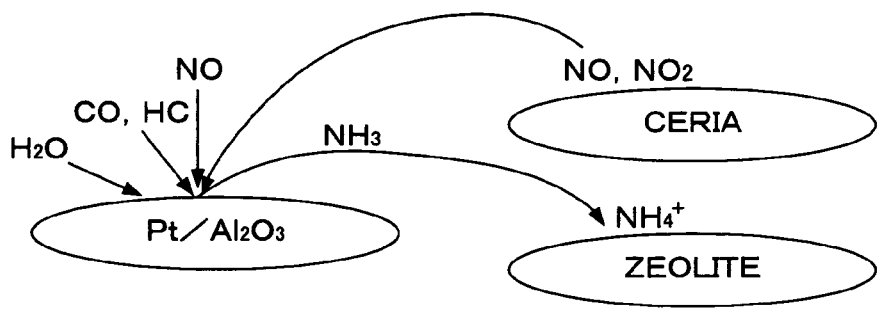
Figure 2C:
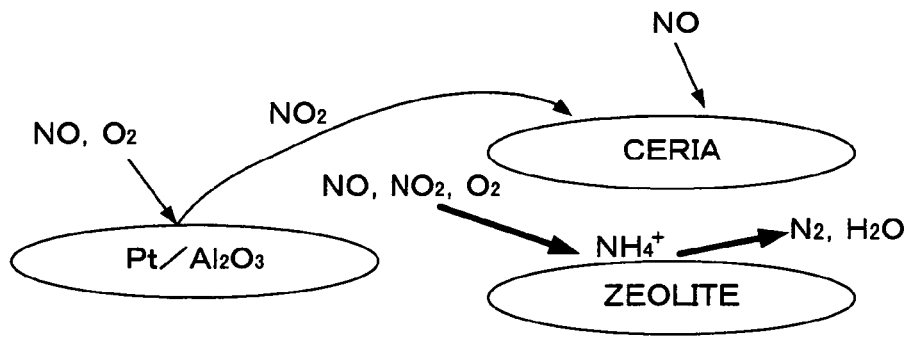

FIGS. 2A-2C illustrate the NOx purification in the NOx purifying device 11. First, in the initial condition, when the air-fuel ratio of the air-fuel mixture, which burns in the engine 1, is set to a value on the lean side with respect to the stoichiometric ratio (i.e., the so-called lean burn operation is performed), the concentration of reducing components in the exhaust gases flowing into the NOx purifying device 11 becomes lower than the oxygen concentration. Accordingly, NO (nitric oxide) and oxygen ($O_2$) in the exhaust gases react by the action of the catalyst, to be adsorbed by the ceria as $NO_2$, as shown in FIG. 2A. Further, the nitric oxide which has not reacted with oxygen is also adsorbed by the ceria.

Next, when deoxidization (i.e., making the concentration of reducing components in the exhaust gases higher than the oxygen concentration) is performed, carbon moNOxide (CO) in the exhaust gases reacts with water ($H_2O$), generating carbon dioxide ($CO_2$) and hydrogen ($H_2$). Further, hydrocarbon (HC) in the exhaust gases reacts with water, generating hydrogen as well as carbon moNOxide and carbon dioxide. Furthermore, as shown in FIG. 2B, NOx contained in the exhaust gases and NOx (NO, $NO_2$) currently adsorbed by the ceria (and the platinum) react with the generated hydrogen by the action of the catalyst to generate ammonia ($NH_3$) and water. These reactions are expressed by the following chemical equations (1)-(3).

$$CO+H_2O \rightarrow CO_2+H_2 \tag{1}$$

$$2NO_2+7H_2 \rightarrow 2NH_3+4H_2O \tag{2}$$

$$2NO+5H_2 \rightarrow 2NH_3+2H_2O \tag{3}$$

The generated ammonia is adsorbed by the zeolite in the form of ammonium ion ($NH_4^+$).

Next, when the air-fuel ratio is set to a value of the lean side with respect to the stoichiometric ratio to perform the lean burn operation, NOx is adsorbed by the ceria as shown in FIG. 2C, like FIG. 2A. Further, under the condition where ammonium ions are adsorbed by the zeolite, NOx and oxygen in the exhaust gases react with ammonia to generate nitrogen ($N_2$) and water as expressed by the following equations (4) and (5).

$$4NH_3 + 4NO + O_2 \rightarrow 4N_2 + 6H_2O \tag{4}$$

$$2NH_3 + NO + NO_2 \rightarrow 2N_2 + 3H_2O \tag{5}$$

As described above, according to the NOx purifying device 11, the ammonia generated during the operation in which the reducing components are supplied is adsorbed by the zeolite, and the adsorbed ammonia reacts with NOx during the lean burn operation. Accordingly, NOx can be efficiently purified (removed from exhaust gases).

Figure 3:
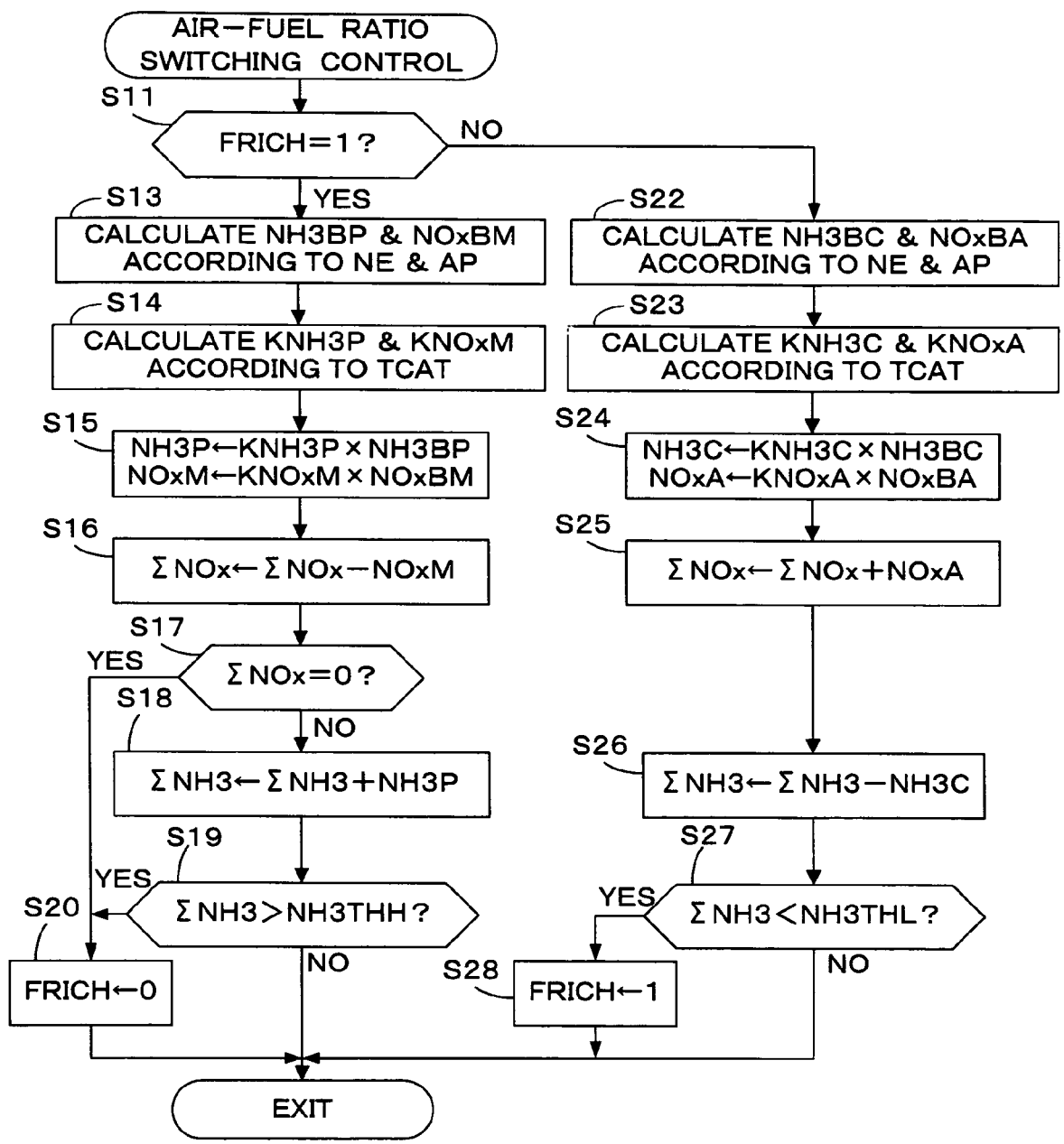
FIG. 3 is a flowchart of an air-fuel ratio switching control process which performs switching control of the lean burn operation and the deoxidizing operation.

FIG. 3 is a flowchart of an air-fuel ratio switching control process which controls switching between the lean burn operation and the deoxidizing operation. This process is executed at constant time intervals (e.g., 100 milliseconds) by the CPU in the ECU 20.

In step S11, it is determined whether an enrichment flag FRICH is "1". The enrichment flag FRICH is set to "1" when performing deoxidization (refer to step S28) and set to "0" when terminating deoxidization and shifting to the lean burn operation (refer to step S20). If FRICH is equal to "1", deoxidization is performed in another process (not shown) by enriching the air-fuel ratio. Specifically, deoxidization is performed by increasing the fuel injection amount and adjusting the opening of the throttle valve 13 to decrease the intake air flow rate.

When the enrichment flag FRICH is "1", the program flow moves to step S13. If the enrichment flag FRICH is "0" (e.g., not "1"), then the program flow moves to step S22.

Figure 6A:
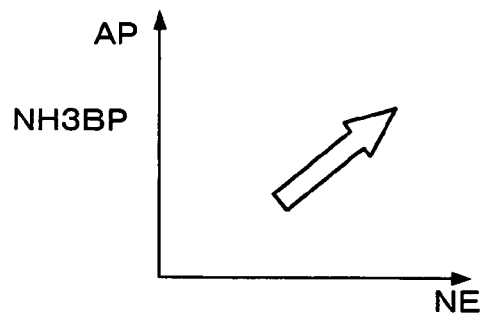
FIGS. 6A and 6B are maps on which a basic ammonia generation amount NH3BP and a basic NOx subtraction amount NOxBM used in the process of FIG. 3 are set.
Figure 6B:
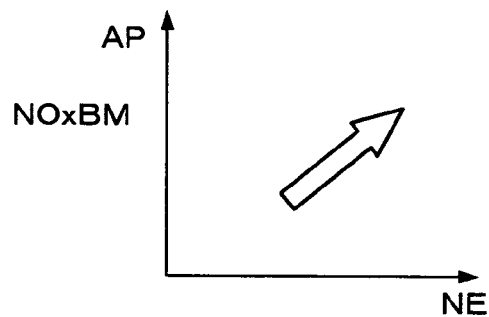

In step S13, a NH3BP map shown in FIG. 6(a) and a NOxBM map shown in FIG. 6(b) are retrieved according to the engine rotational speed NE and the accelerator pedal operation amount AP to calculate a basic ammonia generation amount NH3BP and a basic NOx subtraction amount NOxBM. The basic ammonia generation amount NH3BP indicates an amount of ammonia which is adsorbed by the zeolite per unit time period at a reference catalyst temperature. The basic NOx subtraction amount NOxBM indicates an amount of NOx reduced per unit time period at the reference catalyst temperature. The NH3BP map is set so that the basic ammonia generation amount NH3BP may increase as the engine rotational speed NE increases or as the accelerator pedal operation amount AP increases. The NOxBM map is set so that the basic NOx subtraction amount NOxBM may increase as the engine rotational speed NE increases or as the accelerator pedal operation amount AP increases.

Figure 7A:
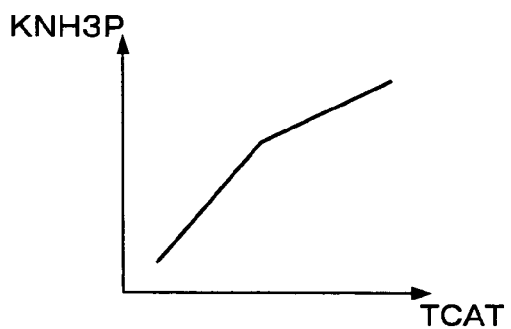
FIGS. 7A and 7B are tables on which an ammonia generation temperature correction coefficient KNH3P and a NOx subtraction temperature correction coefficient KNOxM used in the process of FIG. 3 are set.
Figure 7B:
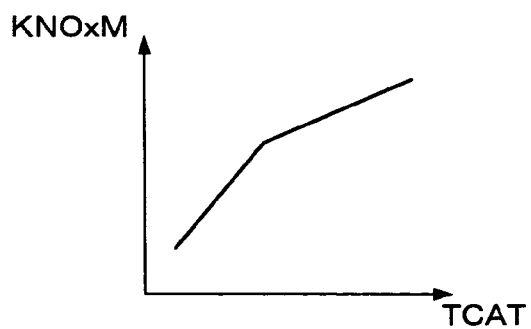

In the next step S14, a KNH3P table shown in FIG. 7(a) and a KNOxM table shown in FIG. 7(b) are retrieved according to the catalyst temperature TCAT to calculate an ammonia generation temperature correction coefficient KNH3P and a NOx subtraction temperature correction coefficient KNOxM.

The KNH3P table is set so that the ammonia generation temperature correction coefficient KNH3P may increase as the catalyst temperature rises. The KNOxM table is set so that the NOx subtraction temperature correction coefficient KNOxM may increase as the catalyst temperature rises.

In the next step S15, an ammonia generation amount NH3P is calculated by multiplying the basic ammonia generation amount NH3BP by the ammonia generation temperature correction coefficient KNH3P using equation (6) shown below. Further, a NOx subtraction amount NOxM is calculated by multiplying the basic NOx subtraction amount NOxBM by the NOx subtraction temperature correction coefficient KNOxM using equation (7) shown below.

$$NH3P = KNH3P \times NH3BP \tag{6}$$

$$NOxM = KNOxM \times NOxBM \tag{7}$$

The basic ammonia generation amount NH3BP and the basic NOx subtraction amount NOxBM are corrected, respectively, by the ammonia generation temperature correction coefficient KNH3P and the NOx subtraction temperature correction coefficient KNOxM since the generation amount of ammonia and the reduction amount of NOx per unit time period change depending on the catalyst temperature TCAT. Therefore, by the correction described above, the ammonia generation amount NH3P and the NOx subtraction amount NOxM can be properly calculated.

When performing deoxidization, the generation amount of ammonia per unit time period increases as the air-fuel ratio decreases (i.e., the concentration of reducing components in the exhaust gases increases). Therefore, the ammonia generation amount NH3P may be calculated using another correction coefficient KNH3AF which is set to increase as the air-fuel ratio decreases. That is, the ammonia generation amount NH3P may be calculated by multiplying the basic ammonia generation amount NH3BP by the correction coefficient KNH3AF in addition to the ammonia generation temperature correction coefficient KNH3P.

In step S16, a residual NOx amount $\Sigma$ NOx is calculated with the equation (8) shown below. The residual NOx amount $\Sigma$ NOx indicates an amount of NOx adsorbed by the ceria in the NOx purifying device 11. If the calculated residual NOx amount $\Sigma$ NOx is less than "0", a limit process is executed to set the residual NOx amount $\Sigma$ NOx to "0".

$$\Sigma NOx = \Sigma NOx - NOxM \tag{8}$$

where $\Sigma$ NOx on the right side is a preceding calculated value.

In step S17, it is determined whether the residual NOx amount $\Sigma$ NOx is "0". If the residual NOx amount $\Sigma$ NOx is "0", the process immediately proceeds to step S20, in which the enrichment flag FRICH is set to "0", to terminate deoxidization. Thereafter, this process ends. If the residual NOx amount $\Sigma$ NOx is not equal to "0", a residual ammonia amount $\Sigma$ NH3 is calculated by the following equation (9) (step S18). The residual ammonia amount $\Sigma$ NH3 indicates a residual amount of ammonia currently adsorbed by the zeolite in the NOx purifying device 11.

$$\Sigma NH3 = \Sigma NH3 + NH3P \tag{9}$$

where $\Sigma$ NH3 on the right side is a preceding calculated value.

In step S19, it is determined whether the residual ammonia amount $\Sigma$ NH3 is greater than an upper limit ammonia threshold value NH3THH. The upper limit ammonia threshold value NH3THH is set to a predetermined value which is in the vicinity of the maximum amount of ammonia which can be adsorbed by the zeolite in the NOx purifying device 11. If the residual ammonia amount $\Sigma$ NH3 is greater than the upper limit ammonia threshold value NH3THH, the process proceeds to step S20, in which the enrichment flag FRICH is set to "0", to terminate deoxidization. Thereafter, this process ends. If the residual ammonia amount $\Sigma$ NH3 is less than or equal to the upper limit ammonia threshold value NH3THH, this process immediately ends.

Figure 8A:
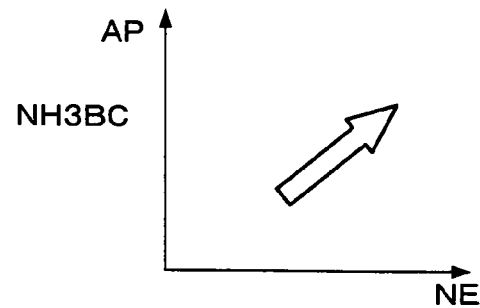
FIGS. 8A and 8B are maps on which a basic ammonia consumption amount NH3BC and a basic NOx addition amount NOxBA used in the process of FIG. 3 are set.
Figure 8B:
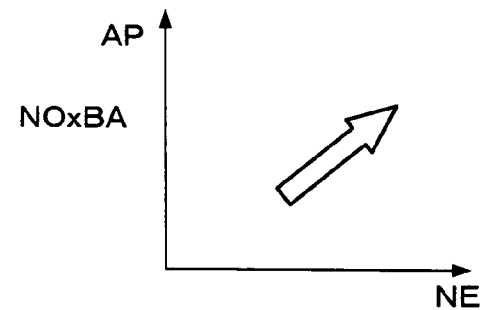

If FRICH is equal to "0" in step S11, the process proceeds to step S22, in which a NH3BC map shown in FIG. 8(a) and a NOxBA map shown in FIG. 8(b) are retrieved according to the engine rotational speed NE and the accelerator pedal operation amount AP to calculate a basic ammonia consumption amount NH3BC and a basic NOx addition amount NOxBA. The basic ammonia consumption amount NH3BC indicates an amount of ammonia consumed per unit time period at the reference catalyst temperature (amount of ammonia used for the reduction of NOx). The basic NOx addition amount NOxBA indicates an amount of NOx adsorbed by the ceria per unit time period at the reference catalyst temperature.

The NH3BC map is set so that the basic ammonia consumption amount NH3BC may increase as the engine rotational speed NE increases or as the accelerator pedal operation amount AP increases. The NOxBA map is set so that the basic NOx addition amount NOxBA may increase as the engine rotational speed NE increases or as the accelerator pedal operation amount AP increases.

Figure 9A:
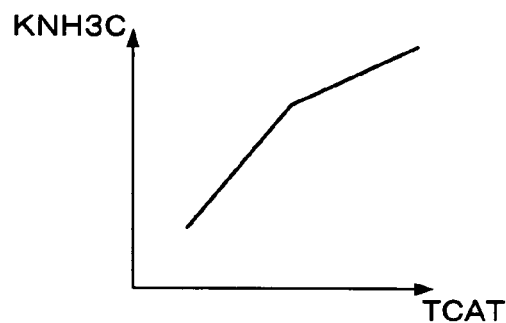
FIGS. 9A and 9B are tables on which an ammonia consumption temperature correction coefficient KNH3C and a NOx addition temperature correction coefficient KNOxA used in the process of FIG. 3 are set.
Figure 9B:
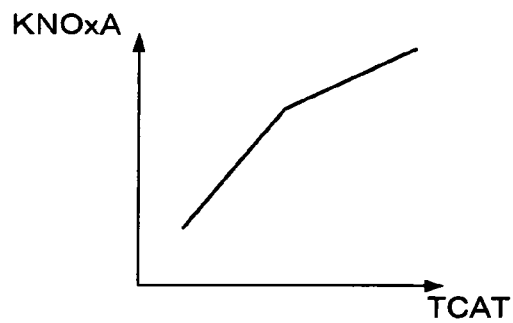

In step S23, a KNH3C table shown in FIG. 9(a) and a KNOxA table shown in FIG. 9(b) are retrieved according to the catalyst temperature TCAT, to calculate an ammonia consumption temperature correction coefficient KNH3C and a NOx addition temperature correction coefficient KNOxA.

The KNH3C table is set so that the ammonia consumption temperature correction coefficient KNH3C may increase as the catalyst temperature rises. The KNOxA table is set so that the NOx addition temperature correction coefficient KNOxA may increase as the catalyst temperature rises.

In the next step S24, an ammonia consumption amount NH3C is calculated by multiplying the basic ammonia consumption amount NH3BC by the ammonia consumption temperature correction coefficient KNH3C using equation (10) shown below. Further, a NOx addition amount NOxA is calculated by multiplying the basic NOx addition amount NOxBA by the NOx addition temperature correction coefficient KNOxA using equation (11) shown below.

$$NH3C = KNH3C \times NH3BC \quad (10)$$

$$NOxA = KNOxA \times NOxBA \quad (11)$$

The basic ammonia consumption amount NH3BC and the basic NOx addition amount NOxBA are corrected, respectively, by the ammonia consumption temperature correction coefficient KNH3C and the NOx addition temperature correction coefficient KNOxA since the consumption amount of ammonia and the adsorption amount of NOx per unit time period change depending on the catalyst temperature TCAT. Therefore, by the correction described above, the ammonia consumption amount NH3C and the NOx addition amount NOxA can be properly calculated.

When performing the lean burn operation, the generation amount of NOx per unit time period increases as the exhaust gas recirculation amount decreases. Therefore, the NOx addition amount NOxA may be calculated using another correction coefficient KNOxEGR which is set so as to increase as the exhaust gas recirculation amount decreases. That is, the NOx addition amount NOxA may be calculated by multiplying the basic NOx addition amount NOxBA by the correction coefficient KNOxEGR in addition to the NOx addition temperature correction coefficient KNOxA.

In step S25, the residual NOx amount Σ NOx is calculated by equation (12) shown below.

$$\Sigma NOx = \Sigma NOx + NOxA \quad (12)$$

where Σ NOx on the right side is a preceding calculated value.

In step S26, the residual ammonia amount Σ NH3 is calculated by equation (13) shown below.

$$\Sigma NH3 = \Sigma NH3 - NH3C \quad (13)$$

where Σ NH3 on the right side is a preceding calculated value.

In step S27, it is determined whether the residual ammonia amount Σ NH3 is less than a lower limit ammonia threshold value NH3THL. The lower limit ammonia threshold value NH3THL is set to a predetermined value in the vicinity of "0". If the residual ammonia amount Σ NH3 is less than the lower limit ammonia threshold value NH3THL, the process proceeds to step S28. In step S28, the enrichment flag FRICH is set to "1", and thereafter, this process ends. If the residual ammonia amount Σ NH3 is greater than or equal to the lower limit ammonia threshold value NH3THL, this process immediately ends.

According to the process of FIG. 3, when the residual ammonia amount Σ NH3 becomes less than the lower limit ammonia threshold value NH3THL during the lean burn operation, the enrichment flag FRICH is set to "1" and deoxidization is started. On the other hand, when the residual ammonia amount Σ NH3 exceeds the upper limit ammonia threshold value NH3THH during execution of deoxidization, the enrichment flag FRICH is set to "0" and the engine operation is shifted from the enrichment operation (deoxidizing operation) to the lean burn operation. That is, the concentration of reducing components in the exhaust gases flowing into the NOx purifying device 11 is switched from the higher side to the lower side or from the lower side to the higher side with respect to the oxygen concentration according to the residual ammonia amount Σ NH3.

NOx purification performance of the NOx purifying device 11 during the lean burn operation changes depending on the residual ammonia amount Σ NH3. Therefore, by switching from the lean burn operation to the deoxidizing operation according to the residual ammonia amount Σ NH3, the deoxidizing operation can be started at a proper timing, thereby maintaining good NOx purification performance. Further, the situation, where the ammonia generation amount exceeds the ammonia retaining capacity of the NOx purifying device 11, can be avoided by switching from the deoxidizing operation to the lean burn operation according to the residual ammonia amount Σ NH3.

Figure 4:
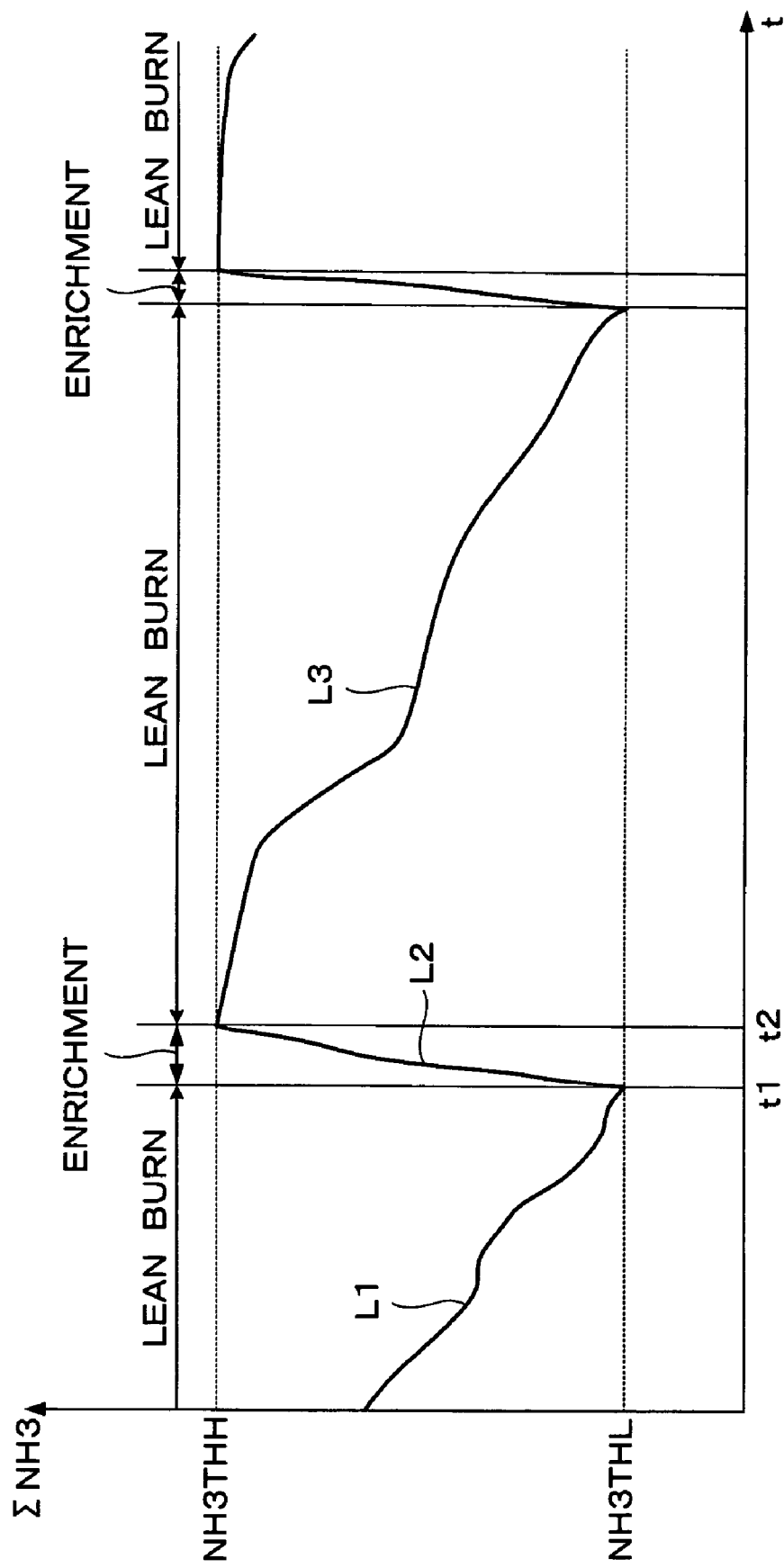
FIG. 4 is a time chart for illustrating the process of FIG. 3.

FIG. 4 is a time chart for illustrating the process of FIG. 3. The lines L1-L3 in FIG. 4 show changes in the residual ammonia amount Σ NH3.

In the period before time t1, the enrichment flag FRICH is set to "0" and the lean burn operation is performed. That is, the concentration of reducing components in the exhaust gases flowing into the NOx purifying device 11 is set to a value which is lower than the oxygen concentration, and the ammonia adsorbed by the zeolite reacts with NOx and oxygen in the exhaust gases. Accordingly, the residual ammonia amount Σ NH3 decreases as shown by the line L1. At time t1, if the residual ammonia amount Σ NH3 becomes less than the lower limit ammonia threshold value NH3THL, the enrichment flag FRICH is set to "1" (step S28), and the concentration of reducing components in the exhaust gases flowing into the NOx purifying device 11 is switched from the lower side to the higher side with respect to the oxygen concentration. That is, deoxidization is performed.

When the concentration of reducing components in the exhaust gases flowing into the NOx purifying device 11 is set to a value which is higher than the oxygen concentration, ammonia is generated and adsorbed by the zeolite. Accordingly, the residual ammonia amount Σ NH3 increases as shown by the line L2. At time t2, if the residual ammonia amount Σ NH3 exceeds the upper limit ammonia threshold value NH3THH, the enrichment flag FRICH is set to "0" (step S20), and the concentration of reducing components in the exhaust gases flowing into the NOx purifying device 11 is switched from the higher side to the lower side with respect to the oxygen concentration. That is, deoxidization is terminated and the engine operation is shifted to the lean burn operation. Thereafter, the residual ammonia amount Σ NH3 decreases again as shown by the line L3.

In the above-described embodiment, the NOx purifying device 11 corresponds to the NOx purifying means; the fuel injection valve 12 and the throttle valve 13 constitute a part of the exhaust control means; and the ECU 20 constitutes the residual amount estimating means and a part of the exhaust control means. Specifically, steps S13-S15, S18, S22-S24, and S26 of FIG. 3 correspond to the residual amount estimating means, and steps S19, S20, S27, and S28 of FIG. 3 correspond to the exhaust control means.

The present invention is not limited to the embodiment described above and various modifications may be made. For example, in the above-described embodiment, switching the concentration of reducing components in the exhaust gases flowing into the NOx purifying device 11 from the lower side to the higher side with respect to the oxygen concentration is performed according to only the residual ammonia amount Σ NH3. Alternatively, as shown in FIG. 5, switching the concentration of reducing components in the exhaust gases from the lower side to the higher side may be performed according to the residual NOx amount Σ NOx in addition to the residual ammonia amount Σ NH3.

Figure 5:
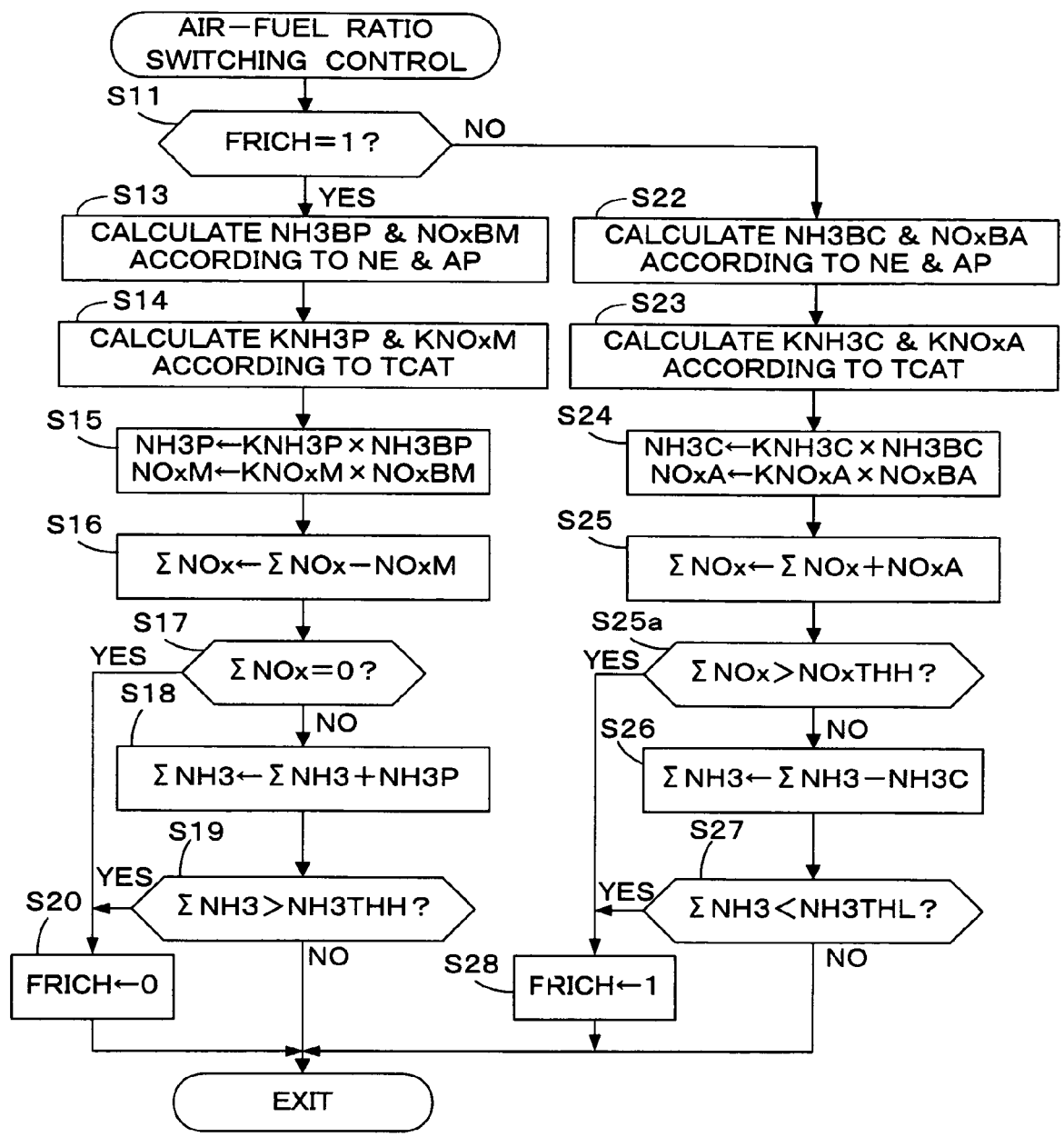
FIG. 5 is a flowchart showing a modification of the process of FIG. 3.

FIG. 5 is obtained by adding step S25a to the process of FIG. 3. In step S25a, it is determined whether the residual NOx amount Σ NOx is greater than an upper limit NOx threshold value NOxTHH. The upper limit NOx threshold value NOxTHH is set to a predetermined value in the vicinity of the maximum amount of NOx which can be adsorbed by the ceria (and platinum) in the NOx purifying device 11. If the residual NOx amount Σ NOx is greater than the upper limit NOx threshold value NOxTHH, the process proceeds to step S28, in which the enrichment flag FRICH is set to "1", to perform deoxidization. Thereafter, this process ends. If the residual NOx amount Σ NOx is less than or equal to the upper limit NOx threshold value NOxTHH, the process proceeds to step S26.

Further, in the above-described embodiment, switching the concentration of reducing components in the exhaust gases flowing into the NOx purifying device 11 from the higher side to the lower side, as well as switching from the lower side to the higher side with respect to the oxygen concentration, are performed according to the residual ammonia amount Σ NH3. Alternatively, only one switching of the concentration of reducing components in the exhaust gases from the higher side to the lower side with respect to the oxygen concentration and switching from the lower side to the higher side may be performed according to the residual ammonia amount Σ NH3. In such occasion, the switching which is not performed according to the residual ammonia amount Σ NH3 may be performed according to the residual NOx amount Σ NOx (refer to steps S17 and S25a).

Further, in the above-described embodiment, switching the concentration of reducing components in the exhaust gases from the higher side to the lower side with respect to the oxygen concentration is performed according to the residual NOx amount Σ NOx in addition to the residual ammonia amount Σ NH3. Alternatively, this switching may be performed according to only the residual ammonia amount Σ NH3.

In the above-described embodiment, the basic ammonia generation amount NH3BP, the basic NOx subtraction amount NOxBM, the basic ammonia consumption amount NH3BC, and the basic NOx addition amount NOxBA are calculated according to the engine rotational speed NE and the accelerator pedal operation amount AP. Alternatively, these parameters may be calculated according to the air-fuel ratio detected by the LAF sensor 23 and the intake air flow rate GA detected by the intake air flow rate sensor 21.

Further, in the above-described embodiment, the basic ammonia generation amount NH3BP is corrected by the ammonia generation temperature correction coefficient KNH3P. Alternatively, the basic ammonia generation amount NH3BP may be further corrected by the residual NOx amount Σ NOx.

In the above-described embodiment, one main fuel injection is performed corresponding to one cylinder in one combustion cycle, and deoxidization is performed by increasing the fuel injection amount TOUT of the main injection. Alternatively, deoxidization may be performed by executing at least one post injection (supplemental fuel injection executed after the main injection) in addition to the main injection. Further, the mechanism for supplying reducing components, such as fuel, hydrogen, or ammonia, directly to the exhaust pipe 4, may be provided as a reducing components supply means, and this reducing components supply means may perform deoxidization.

Further, in the above-described embodiment, ceria is used as a NOx adsorbent. Alternatively, substances other than ceria, which are capable of adsorbing NOx, may be used as the NOx adsorbent.

Further, in the above-described embodiment, the present invention is applied to the diesel internal combustion engine. The present invention can be applied also to a gasoline internal combustion engine. Furthermore, the present invention can be applied also to the air-fuel ratio control for a watercraft propulsion engine, such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An exhaust gas purifying apparatus for an internal combustion engine having an exhaust system, the apparatus comprising:

NOx purifying means provided in said exhaust system for purifying NOx in exhaust gases from said engine under a condition where a concentration of oxygen in the exhaust gases is higher than a concentration of reducing components in the exhaust gases, for generating ammonia and retaining the generated ammonia when the concentration of reducing components in the inflowing exhaust gases is higher than the concentration of oxygen, and for purifying NOx with the retained ammonia when the concentration of reducing components in the inflowing exhaust gases is lower than the concentration of oxygen, said NOx purifying means adsorbing NOx when the concentration of oxygen is higher than the concentration of reducing components, and said NOx purifying means generating ammonia from the adsorbed NOx when the concentration of reducing components is higher than the concentration of oxygen;

residual amount estimating means for estimating a residual amount of ammonia retained in said NOx purifying means, wherein said residual amount estimating means estimates the residual amount of ammonia according to a temperature of said NOx purifying means;

exhaust control means for switching the concentration of reducing components in the exhaust gases flowing into said NOx purifying means from a lower side to a higher side with respect to the concentration of oxygen, and from the higher side to the lower side, according to the residual amount of ammonia estimated by said residual amount estimating means;

rotational speed detecting means for detecting a rotational speed of said engine; and accelerator pedal operation amount detecting means for detecting an operation amount of an accelerator pedal provided in a vehicle driven by said engine, wherein said residual amount estimating means estimates the residual amount of ammonia according to the detected engine rotational speed and the detected accelerator pedal operation amount, and wherein said residual amount estimating means comprises:

basic generation amount calculating means for calculating a basic generation amount of ammonia according to the detected engine rotational speed and the detected accelerator pedal operation amount, when the concentration of reducing components is higher than the concentration of oxygen;

first temperature correction coefficient calculating means for calculating a first temperature correction coefficient according the temperature of said NOx purifying means;

ammonia generation amount calculating means for calculating a generation amount of ammonia by correcting the basic generation amount with the first temperature correction coefficient;

basic consumption amount calculating means for calculating a basic consumption amount of ammonia according to the detected engine rotational speed and the detected accelerator pedal operation amount, when the concentration of reducing components is lower than the concentration of oxygen:

second temperature correction coefficient calculating means for calculating a second temperature correction coefficient according the temperature of said NOx purifying means;

ammonia consumption amount calculating means for calculating a consumption amount of ammonia by correcting the basic consumption amount with the second temperature correction coefficient, wherein said residual amount estimating means calculates the residual amount using the generation amount and the consumption amount of ammonia.

2. An exhaust gas purifying method for an internal combustion engine having an exhaust system, comprising the steps of:

a) providing a NOx purifying device in said exhaust system for purifying NOx in exhaust gases from said engine under a condition where a concentration of oxygen in the exhaust gases is higher than a concentration of reducing components in the exhaust gases, said NOx purifying device generating ammonia and retaining the generated ammonia when the concentration of reducing components in the inflowing exhaust gases is higher than the concentration of oxygen, and said NOx purifying device purifying NOx with the retained ammonia when the concentration of reducing components in the inflowing exhaust gases is lower than the concentration of oxygen, said NOx purifying device adsorbing NOx when the concentration of oxygen is higher than the concentration of reducing components, and said NOx purifying device generating ammonia from the adsorbed NOx when the concentration of reducing components is higher than the concentration of oxygen;

b) estimating a residual amount of ammonia retained in said NOx purifying device, wherein the residual amount of ammonia is estimated according to a temperature of said NOx purifying device;

c) switching the concentration of reducing components in the exhaust gases flowing into said NOx purifying device from a lower side to a higher side with respect to the concentration of oxygen, and from the higher side to the lower side, according to the estimated residual amount of ammonia;

d) detecting a rotational speed of said engine; and e) detecting an operation amount of an accelerator pedal provided in a vehicle driven by said engine, wherein the residual amount of ammonia is estimated according to the detected engine rotational speed and the detected accelerator pedal operation amount, and wherein said step b) of estimating the residual amount of ammonia includes the steps of:

i) calculating a basic generation amount of ammonia according to the detected engine rotational speed and the detected accelerator pedal operation amount, when the concentration of reducing components is higher than the concentration of oxygen;

ii) calculating a first temperature correction coefficient according the temperature of said NOx purifying device;

iii) calculating a generation amount of ammonia by correcting the basic generation amount with the first temperature correction coefficient;

iv) calculating a basic consumption amount of ammonia according to the detected engine rotational speed and the detected accelerator pedal operation amount, when the concentration of reducing components is lower than the concentration of oxygen;

v) calculating a second temperature correction coefficient according the temperature of said NOx purifying device; and vi) calculating a consumption amount of ammonia by correcting the basic consumption amount with the second temperature correction coefficient, wherein the residual amount is calculated using the generation amount and the consumption amount of ammonia.

* * * * *